United States Patent [19]

Bowman et al.

[11] Patent Number: 4,482,516
[45] Date of Patent: Nov. 13, 1984

[54] PROCESS FOR PRODUCING A HIGH STRENGTH POROUS POLYTETRAFLUOROETHYLENE PRODUCT HAVING A COARSE MICROSTRUCTURE

[75] Inventors: Jeffery B. Bowman, Flagstaff, Ariz.; Daniel E. Hubis, Elkton, Md.; James D. Lewis, Flagstaff, Ariz.; Stephen C. Newman, Flagstaff, Ariz.; Richard A. Staley, Flagstaff, Ariz.

[73] Assignee: W. L. Gore & Associates, Inc., Newark, Del.

[21] Appl. No.: 416,466

[22] Filed: Sep. 10, 1982

[51] Int. Cl.³ .................... B29C 17/02; B29D 27/00
[52] U.S. Cl. .................... 264/127; 264/280; 264/288.8; 264/289.3
[58] Field of Search .................... 264/127, 175, 288.8, 264/289.3, 280

[56] References Cited

U.S. PATENT DOCUMENTS

| | | |
|---|---|---|
| 2,642,625 | 6/1953 | Peck . |
| 3,027,601 | 4/1962 | Barry . |
| 3,060,517 | 10/1962 | Fields . |
| 3,953,566 | 4/1976 | Gore .................... 264/127 |
| 4,049,589 | 9/1977 | Sakane .................... 264/127 |
| 4,096,227 | 6/1978 | Gore . |
| 4,110,392 | 8/1978 | Yamazaki .................... 264/127 |
| 4,177,334 | 12/1979 | Okita . |
| 4,209,480 | 6/1980 | Homsy . |
| 4,225,547 | 9/1980 | Okita .................... 264/127 |
| 4,248,924 | 2/1981 | Okita . |
| 4,250,138 | 2/1981 | Okita .................... 264/292 |
| 4,277,429 | 7/1981 | Okita .................... 264/127 |

FOREIGN PATENT DOCUMENTS

| | | | |
|---|---|---|---|
| 2125276 | 11/1972 | Fed. Rep. of Germany ...... 264/127 |
| 54-61259 | 5/1979 | Japan .................... 264/127 |

*Primary Examiner*—James Lowe
*Attorney, Agent, or Firm*—Finnegan, Henderson, Farabow, Garrett & Dunner

[57] ABSTRACT

Porous polytetrafluoroethylene materials having high strength and coarse microstructure are produced by densifying the materials after removal of lubricant and then stretching. The term, "coarse," is used to indicate that the nodes are larger, the fibrils are longer, and the effective pore size is larger than conventional materials of the same matrix tensile strength. Densification can be achieved through the use of such devices as a densification die, a calender machine, or a press. This invention can be used to produce all kinds of shaped articles.

18 Claims, 16 Drawing Figures

DIRECTION OF UNIAXIAL STRETCHING

PROCESS FOR PRODUCING A HIGH STRENGTH POROUS POLYTETRAFLUOROETHYLENE PRODUCT HAVING A COARSE MICROSTRUCTURE

BACKGROUND OF THE INVENTION

1. Field of the Invention

This invention relates to porous polytetrafluoroethylene (hereinafter "PTFE") materials having a unique and useful combination of high strength and coarse microstructure, and a method for producing these materials. Articles made from these materials are particularly suitable for use in the medical field.

2. Description of the Prior Art

The products of this invention derive from paste formed products of PTFE. Paste extrusion or paste forming techniques are old in the art and consist of mixing a coagulated dispersion of polytetrafluoroethylene resin with a liquid lubricant and forcing the mixture through an extrusion die or otherwise working the lubricated mixture to form a coherent shaped article. The lubricant is then removed, usually by drying, to form a porous, unsintered PTFE article having a density usually within the range of 1.4 to 1.7 gm/cc. Such densities correspond to porosities of 39% to 26%, respectively. At this stage, the article can be raised above its crystalline melt point of about 345° C. to sinter it, coalescing the porous material to form a non-porous sintered article.

Alternatively, the unsintered article can be made more porous and stronger by stretching according to techniques taught in U.S. Pat. No. 3,953,566. Subsequent to stretching, the stretched article can be held restrained and heat treated above the crystalline melt point. In this instance, the article remains porous and when cooled a strong porous article of PTFE is obtained. In the discussions which follow, the term "sintering" is used interchangeably with the process step of raising the unsintered article above its crystalline melting point. U.S. Pat. No. 3,953,566 provides a method of producing all kinds of microporous stretched PTFE, such as films, tubes, rods, and continuous filaments. The articles are covered by U.S. Pat. No. 4,187,390. The microstructure of these articles consists of nodes interconnected by fibrils.

The key element of the U.S. Pat. No. 3,953,566 process is rapid stretching of PTFE. Rapid stretching allows the unsintered article to be stretched much farther than had previously been possible while at the same time making the PTFE stronger. The rapid stretching also produces a microstructure which is very fine in scale having, for example, a very small effective pore size. U.S. Pat. No. 3,962,153 describes very highly stretched products, stretch amounts exceeding 50 times the original length. The products of both the U.S. Pat. Nos. 4,187,390 and 3,962,153 patents have relatively high matrix tensile strengths. (See discussion of "matrix tensile strengths" and relation to article tensile strength and density in U.S. Pat. No. 3,953,566 at col. 3, lines 28-43.)

To compute the marix tensile strength of a porous specimen, one divides the maximum force required to break the sample by the cross sectional area of the porous sample, and then multiplies this quantity by the ratio of the density of the PTFE polymer component divided by the density of the porous specimen. The density of PTFE which has never been raised above its crystalline melt point is 2.30 gm/cc while the density of PTFE which has been sintered or raised above its crystalline melt point may range from above 2.0 gm/cc to below 2.30 gm/cc. For purposes of calculating matrix tensile strength in examples which follow, we have used a density of the PTFE polymer of 2.20 gm/cc for products which have been raised above the crystalline melt point, and a density of 2.30 gm/cc for those which have not.

When the unsintered articles are stretched at slower rates, either limited stretching occurs because the material breaks, or weak materials are obtained. These weak materials have microstructures that are coarser than articles that are stretched equivalent amounts but at faster rates of stretch. The term, "coarse," is used to indicate that the nodes are larger, the fibrils are longer, and the effective pore size is larger. Such coarse microstructures would have further utility if they were strong instead of weak.

SUMMARY OF THE INVENTION

The invention described herein teaches the manufacture of coarse, highly porous articles of PTFE which are strong and have microstructures of relatively large nodes interconnected by relatively long fibrils as compared to prior art products. Such microstructures are desired in many instances, and particularly in the biological field where the microstructure must be large enough to allow cellular ingrowth and incorporation of body tissue. The key process element of the invention described herein is densification of the unsintered PTFE article after removal of lubricant and prior to stretching.

DESCRIPTION OF THE PREFERRED EMBODIMENTS

Figure 1:
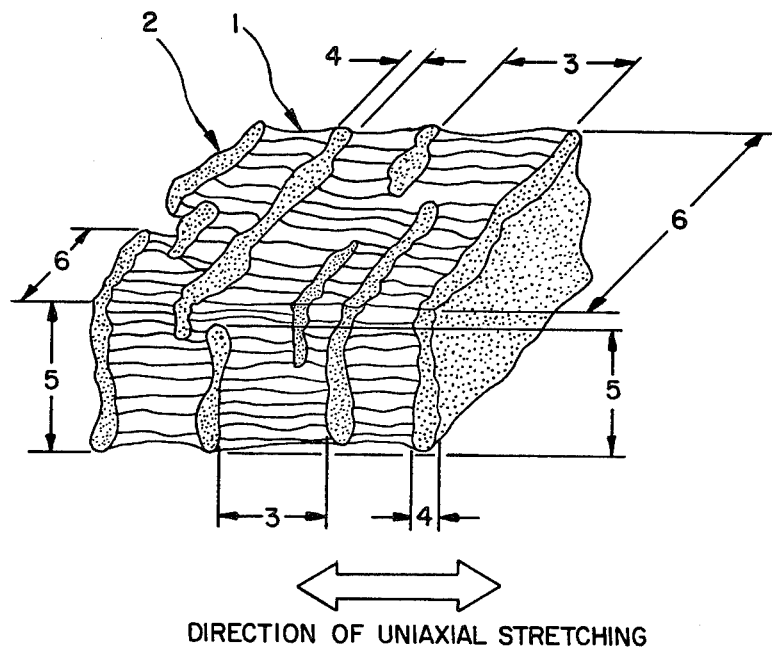
FIG. 1 is a schematic representation of the microstructure of the PTFE material of the present invention.

A fully densified unsintered article of PTFE is one in which there is no void space and such an article has a density of 2.30 gm/cc. When stretched under the same conditions, it is found that articles which have been densified to near this limit prior to stretching show dramatically coarser structures than articles which have not been densified. There is an increasing effect with increasing densification. The highest densifications produce the most dramatic effect. In order to achieve the highest densification, it is necessary that the densified article be subjected to compressive forces until all void closure is achieved. At a fixed temperature, increased compressive force accelerates the rate of densification, as would be expected. For a given compressive force, densification will occur faster at higher temperatures in the range of 300° C. than it will at lower temperatures. Less force may be required to achieve densification at higher temperatures. Higher temperatures, therefore, may facilitate the densification inasmuch as less time and/or less compressive force may be required. However, for otherwise identical conditions, it appears that equivalent stretched articles are obtained independent of whether densification occurs at low temperatures or at high temperatures as long as equivalent densifications are achieved. It appears that the only significant variable is the actual densification achieved as measured by the density of the densified article prior to stretching.

Experiments described herein show that when densification conditions are used that result in sintering the material, the material may not be able to be uniformly stretched. Partial sintering is known to occur below 345° C. The conditions that cause sintering, therefore, establish the upper useful limit for the densification temperature.

Densification can be performed through the use of presses, dies, or calendering machines. The use of a calendering machine to densify the dry PTFE enables the manufacture of long lengths of film.

The preferred conditions for densification in a die appear to involve pulling the material through the die at relatively low rates. The force exerted to pull the material through the die may result in stretching the material that has exited the die. Lower rates require less force to pull the material through the die which results in less stretching of the material. It appears to be desirable to minimize stretching out of the die. Stretching is better controlled in process steps specifically designed to stretch the material.

A number of processing steps can be performed prior to densification, such as calendering with the lubricant present and stretching with or without the lubricant present. These steps may increase the strength of the final article, but again, such preferred processes have not been detected. Further, it may be preferred to not fully densify the material prior to stretching. It is believed that the densification can be achieved by applying compressive forces in any or all directions and that stretching can subsequently be performed in any or all directions to yield the benefits of this invention.

It is believed that all prior art processes specific to producing porous PTFE articles can be used in conjunction with the present invention.

Figure 2:
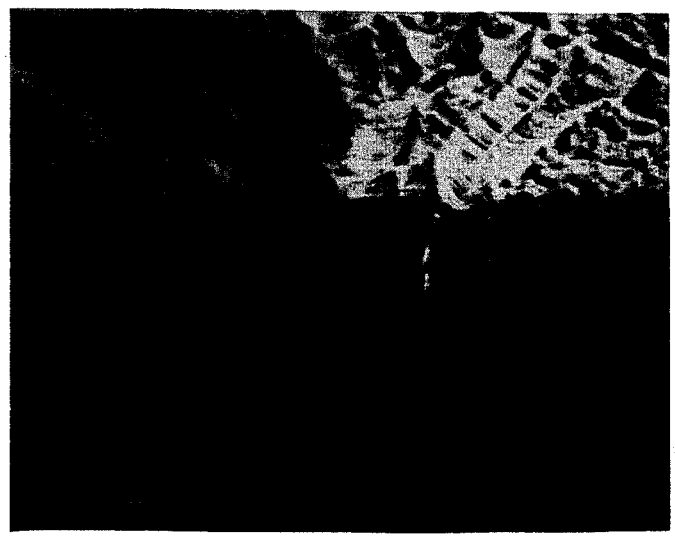
FIG. 2 is a photomicrograph of the PTFE material of the present invention.

While the fibril lengths and node dimensions are particularly appropriate characteristics for identifying coarse microstructures, they present some problems in quantification. This arises because there is a distribution of node sizes and a distribution of fibril lengths in any given microstructure. Also, somewhat different microstructures are obtained depending on whether the article has been uniaxially stretched, biaxially stretched, or sequentially stretched first in one direction followed by stretching in a second direction. An idealized drawing of the node-fibril structure for the case of uniaxial stretch of a film is shown in FIG. 1. The actual electron micrograph of 198 magnification for this structure is shown in FIG. 2.

Articles of the present invention have larger nodes and longer fibrils than prior art materials of similar matrix tensile strength. The four characteristic dimensions of the microstructure are: node height, node width, node length, and fibril length. See FIG. 1 for the definition of these dimensions of nodes 2 and fibrils 1 for uniaxially stretched films. Fibril length 3 and node width 4 are measured in the direction of stretching. Node length 6 is measured in the width direction of the film; that is, orthogonal to the direction of stretching, in the plane of stretching. Node height 5 is measured in the thickness direction of the film; that is, orthogonal to the plane of stretching. The distinction between node width and node length may not be obvious for films stretched in more than one direction, since the fibrils may be oriented in many directions and the nodes may be of the same size in more than one direction. In this case, node width is defined as the node dimension in the same direction as the longest fibrils, in the plane of stretching. Node height is measured in the thickness direction of the film; that is, orthogonal to the plane of stretching. The distinction between node length and node height may not be obvious for articles with a symmetrically shaped cross-section, such as circular rods, filaments, and articles with a square cross-section. In this case, node height and node length are said to be the same dimension termed "node height" and this dimension is measured in the direction orthogonal to stretching.

The combination of measurements of two microstructure dimensions and strength in the strongest direction can be used to distinguish between articles of this invention and prior art articles. The combination of the ratio of average node height to average node width, in addition to the average matrix tensile strength in the strongest direction, is useful for characterizing articles of the present invention. Articles of this invention that have been sintered have a node height to node width ratio greater than or equal to about 3, and a matrix tensile strength greater than or equal to about 15,000 psi.

For materials that have been biaxially stretched, or stretched first in one direction followed by stretching in a second direction, there is some difficulty in precisely quantifying the geometry of the node-fibril structure. Materials that have been stretched in more than one direction have a greater range of distribution of microstructure dimensions. For this reason, coarseness has also been defined in terms of other properties and particularly in terms of the ethanol bubble point (EBP), which is a measure of the maximum pore size in the test specimen (see ASTM F316-80). Specifically, the EBP is the minimum pressure required to force air through an ethanol-saturated article of this invention. Raising the pressure slightly should produce steady streams of bubbles at many sites. Thus, the measurements are not biased by artifacts such as puncture holes in the material. Ethanol bubble point is inversely related to pore size; lower values of EBP indicate larger pores, or in the terminology of this application, coarser structure. It is believed that EBP can be assumed to be independent of the length of the path that the air travels through the article. In other words, it is believed that EBP provides a characterization of pore size that is not unacceptably dependent on the dimensions of the tested article.

Another indicator of coarse structure is relatively low resistance to the passage of air (Gurley number). Gurley number is defined as the time in seconds for 100 cc of air to flow through one square inch of material for a pressure of 4.9 inches of water across the material. See ASTM D-726-58 for a method of measuring the Gurley number.

In order to provide a basis for comparison of coarseness for articles that have been densified to different densities and subsequently stretched, a "coarseness index" is defined here as the density of the stretched porous article divided by the EBP of that article. Density is an indicator of pore volume. Should two articles be of the same density, the article with the lower EBP is said to be coarser. Should two articles have the same pore size, the article with the higher density is said to be coarser. Thus, the coarseness index is directly proportional to density and inversely proportional to EBP. An increase in coarseness is indicated by an increase in the coarseness index. Introducing the density in combination with EBP provides a means of comparing prior art articles with articles of this invention over a wide range of matrix tensile strengths.

Sintering a restrained stretched article does lower the EBP of the article, and usually increases the coarseness index. However, in some cases the coarseness index may not increase due to sintering since the density of the article may be lowered by sintering.

Figure 3:
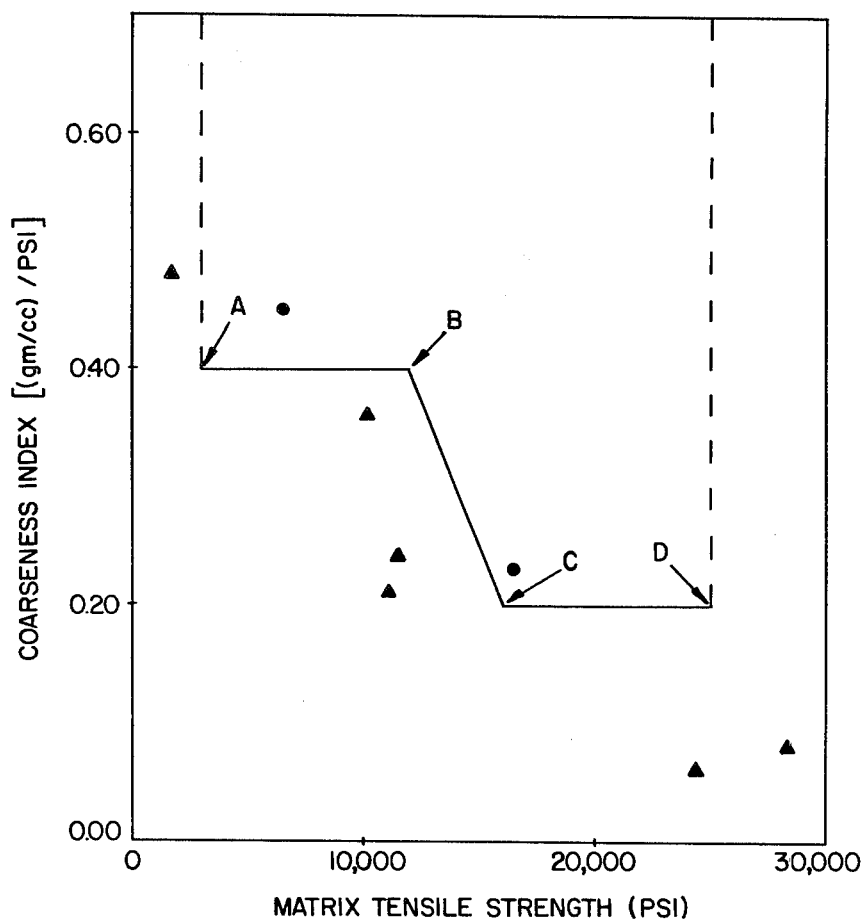
FIG. 3 is a diagram which shows a characteristic range of the coarseness index and matrix tensile strength obtained by densifying prior to stretching, and a characteristic range in the prior case of not densifying prior to stretching.

FIG. 3 presents a graph of the variables, coarseness index and matrix tensile strength. Articles not heretofore available are produed with the present invention to have a matrix tensile strength greater than or equal to about 3,000 psi and have a corresponding coarseness index greater than or equal to the value on a line connected by the points A, B, C, and D. The coordinates of these points are as follows: Point A [3,000 psi, 0.40 (gm/cc)/psi], Point B [12,000 psi, 0.40 (gm/cc)/psi], Point C [16,000 psi, 0.20 (gm/cc)/psi], and Point D [25,000 psi, 0.20 (gm/cc)/psi].

Examples are not given for films processed at stretch ratios exceeding about 4:1 in a direction. Higher stretch ratios generally result in articles with higher matrix tensile strengths, as described in U.S. Pat. No. 3,953,566. No evidence exists to suggest that films of the present invention cannot be stretched further to obtain higher strength while still maintaining coarser structures than prior art films of the same strength. It is expected that processing films at higher stretch ratios will certainly yield films of this invention with matrix tensile strengths exceeding 25,000 psi.

Points in the region corresponding to the present invention were derived from data presented in the examples that follow. The EBP and matrix tensile strength measurements were performed subsequent to sintering the restrained, stretched articles. The conditions of sintering are described in the examples. The matrix tensile strength value used was the value corresponding to the strongest direction of the material. This representation of coarseness and strength is useful for characterizing materials that are stretched in one or more directions prior to or subsequent to sintering.

The representation of coarseness index and strength in FIG. 3 is specific to unfilled porous PTFE articles. Porous PTFE articles may be filled with substances such as asbestos, carbon black, pigments, and mica, as taught by U.S. Pat. Nos. 3,953,566 and 4,096,227. Articles of the present invention can be likewise filled. The presence of a filler, however, may affect the measurement of coarseness index since EBP is a function of the surface tension of the porous article and the filler may affect the surface tension of the article.

Articles of the present invention, therefore, can be characterized in several ways. Either coarseness index or the node height to node width ratio, in conjunction with matrix tensile strength in the strongest direction, can be used to describe the same products of the present invention. That is, coarseness index and the node height to node width ratio are not independent parameters; both describe the structure of articles of the present invention. Coarseness index is particularly useful for describing the structure of thin films in which maximum node height is limited by the thickness of the film. The node height to node width ratio is particularly useful for describing the structure of articles too small to enable the measurement of the EBP. In many cases, either of these parameters can be used to describe the structure of the same articles.

Films of this invention that have strengths of similar magnitude in orthogonal directions can be distinguished from prior art films by the characterization of matrix tensile strength in orthogonal directions and EBP. This characterization pertains to sintered films having the ratio of matrix tensile strengths in orthogonal directions within the range of 0.4 to 2.5, where the weaker direction has a matrix tensile strength greater than or equal to about 3000 psi. Films of this invention that satisfy these strength requirements have an EBP less than or equal to about 4 psi.

Unsintered articles extruded from preferred resins can be stretched farther and more uniformly to achieve stronger stretched products than unsintered articles extruded from non-preferred resins. The preferred resins are highly crystalline (such as Fluon ® CD123 supplied by ICI) but other resins can also be used in practicing this invention. (See U.S. Pat. Nos. 4,016,345 and 4,159,370.)

Processes which might appear to put the unsintered article under a compressive force, but do not achieve densification, can yield results which are not consistent with the teachings of this invention. For example, U.S. Pat. No. 4,250,138 teaches a drawing step which might appear to be consistent with the process described in Example 3 herein. Yet the opposite effect is achieved; i.e., finer structures are obtained as indicated by increased EBP. U.S. Pat. Nos. 4,248,924 and 4,277,429 teach a method of applying compressive forces to a film which might appear to be consistent with the densification step described herein. Again, the opposite effect is achieved; i.e., the prior art process is practiced to diminish the pore size of one side of a film relative to the other side.

The conditions under which the densified article is stretched greatly affect the microstructure that is obtained. Higher rates of stretching yield progressively finer microstructures, and there is the same qualitative interaction of rate of stretch and temperature during stretching that is described in U.S. Pat. No. 3,953,566.

Thus, densified unsintered articles can be stretched under conditions that will yield products that are similar to prior art products, such as those taught in U.S. Pat. Nos. 4,187,390 and 3,962,153. The process of the present invention can also yield products with characteristics not heretofore available. It is these latter materials which are sought to be uniquely identified by the values of parameters set forth in the claims.

The experiments that comprise the examples that follow demonstrate that for otherwise identical processing conditions, the addition of the densification step produces coarser articles as compared to prior art articles of comparable strength. The coarseness was characterized by permeability, largest pore size, and dimensions of the nodes and fibrils. Materials produced with the densification step were seen to have nodes that extended through the thickness of the article (i.e., in the direction orthogonal to the direction(s) of stretch). This structure in a film or tape may result in higher peel strength, and/or higher tensile strength in the thickness direction, and/or higher compressive strength in the thickness direction.

Biaxially stretched films of the present invention have usefulness as surgical reinforcing membranes. Uniaxially stretched filaments of the present invention have usefulness as sutures and ligatures. These articles are both strong and possess coarse microstructures. Coarse microstructures are desirable in medical applications because they allow cellular ingrowth and incorporation of body tissue. Films of the present invention can be useful in the manufacture of coaxial cables because they are both crush-resistant and porous. Films of the present invention also can be useful in applications demanding tensile strength in the thickness direction.

The following examples which disclose processes and products according to the present invention are illustrative only and are not intended to limit the scope of the present invention.

EXAMPLE ONE

Films That Are Uniaxially Stretched

PTFE resin (Fluon CD123, ICI) was paste-extruded as a film extrudate and calendered. The calendered film was then dried to remove the extrusion aid. The properties of the dry, calendered film were as follows: thickness of about 0.016 inch, density of about 1.6 gm/cc, matrix tensile strength in the direction of extrusion of $1.6 \times 10^3$ psi, and matrix tensile strength in the transverse (width) direction of $0.6 \times 10^3$ psi. The dry, calendered extrudate was cut into approximately 4.5 inch by 4.5 inch specimens.

Some of the specimens were then densified by compression in a Carver press that could be heated; the remaining specimens were left undensified at the 1.6 gm/cc density level to serve as test controls. Gage blocks were used between the flat compression plates (and alongside the specimens) to control density by allowing densification only to predetermined thicknesses. In some cases, the gage blocks used were thinner than the thickness that was calculated to yield the desired density. These thinner blocks were required because some of the samples would regain some of their thickness after the compressive forces were removed. A range of densities was examined from 1.6 gm/cc ("control"—undensified) to values approaching the maximum achievable density), 2.3 gm/cc. Densifications were carried out at temperatures from ambient (22° C.) to slightly above 300° C. The times to reach the desired densification temperature and the times to reach the desired densification at these temperatures were noted. The "control" pieces were subjected to the same temperature and time conditions as were used in densification. For convenience, two film samples were stacked together with a sheet of Kapton ® polyimide film (DuPont) between them so that two 4.5 inch by 4.5 inch samples of film could be simultaneously densified.

The following steps were used to densify the dry film:
1. Carver press platens heated to specified temperature;
2. Film inserted between two flat steel plates along with Kapton polyimide film to serve as a release agent;
3. Gage blocks placed on perimeter of sheet. (Gage blocks not used for densification to maximum density.);
4. Plates, with film between, placed inside press;
5. Platens closed until contact made;
6. Steel plates heated to desired temperature for densification;
7. Pressure applied and both steel plates slowly brought into contact with the thickness gage blocks (or specimen, if gage blocks not used);
8. Pressure held for sufficient time to obtain desired densities;
9. Pressure released;
10. Materials densified at higher than ambient temperatures cooled in water upon removal from the press.

The 4.5 inch by 4.5 inch specimens were weighed prior to the densification step. Thickness measurements were taken at the four corners, at about one inch from each edge, and these four readings were averaged. The density was calculated by dividing the weight of the specimen, by the area times the average thickness. This procedure yields a nominal density of the specimen, since the thickness of the specimen varied due to local inconsistencies.

Materials (densified and undensified) were then stretched on a pantograph in the longitudinal direction (i.e., the primary direction of both extrusion and calendering) to accomplish stretching. The photograph used was capable of stretching 4.5 inch by 4.5 inch samples of film to yield 4 inch by 16 inch samples for uniaxial stretching. (An extra 0.25 inch length was required on each side of the specimens to accomodate clamping of the material in the machine.) The 4.5 inch by 4.5 inch film was gripped on each side by 13 actuated clamps, which could be moved apart uniformly on a scissor mechanism at constant velocity to stretch the film. The film was heated to the desired temperature for stretching, by heater plates directly above and below the 4.5 inch by 4.5 inch samples.

The stretch conditions were:
Temperature: approximately 300° C.
Stretch Ratio: 4:1 (300% increase in length)
Stretching Rate: approximately 400%/sec. (determined by dividing the percent change in length by the duration of the stretching operation)

The stretched specimens were then restrained from shrinking, by placing them on a pinframe, and immersed in a 370° C. salt bath for about 20 seconds, thereby sintering the specimens.

Temperature did not appear to significantly affect the densification process. Therefore, the data reported in Table 1 are averages of the measurements obtained for given densities irrespective of the densification temperature.

All data for matrix tensile strength, fibril length, and node width are reported for measurements made in the direction of stretch (which is also the primary direction of extrusion and calendering). Break forces were measured using specimens with a 1 inch gage length; the tensile tester cross-head speeds were 10 inches per minute. The density prior to stretching is listed as a single number and is the aforementioned nominal value. The actual densities after densification varied due to experimental variability and inevitable small measurement error. Thus the individual measurements for the 1.63 gm/cc materials ranged from 1.60 to 1.64 gm/cc. The individual measurements for the 1.83 gm/cc materials ranged from 1.75 to 1.85 gm/cc. The individual measurements for the 2.01 gm/cc materials ranged from 1.97 to 2.04 gm/cc. The individual measurements for the 2.27 gm/cc materials ranged from 2.19 to 2.35 gm/cc. Therefore, the nominal range of 2.27 gm/cc includes the maximum obtainable densities.

Figure 4:
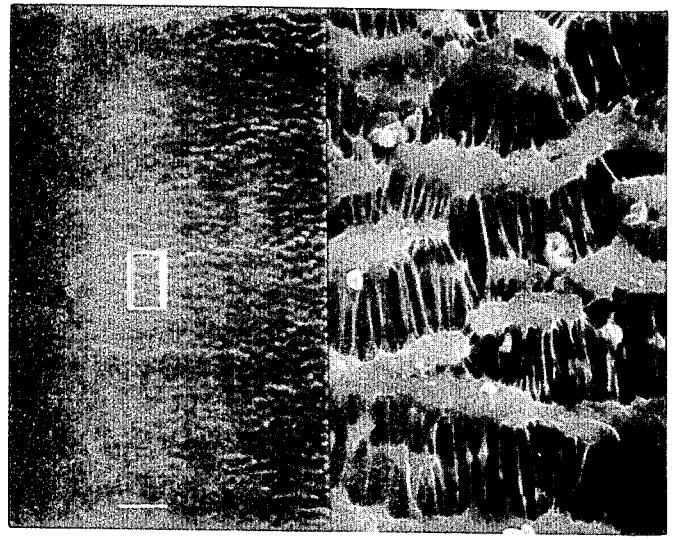
FIG. 4 is a photomicrograph of the surface of prior art PTFE material that was stretched in one direction.
Figure 5:
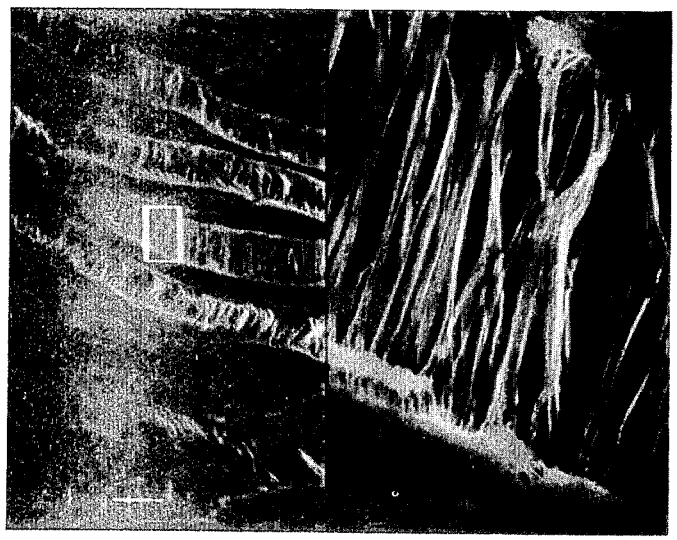
FIG. 5 is a photomicrograph of the surface of PTFE material of the present invention that was stretched in one direction.
Figure 6:
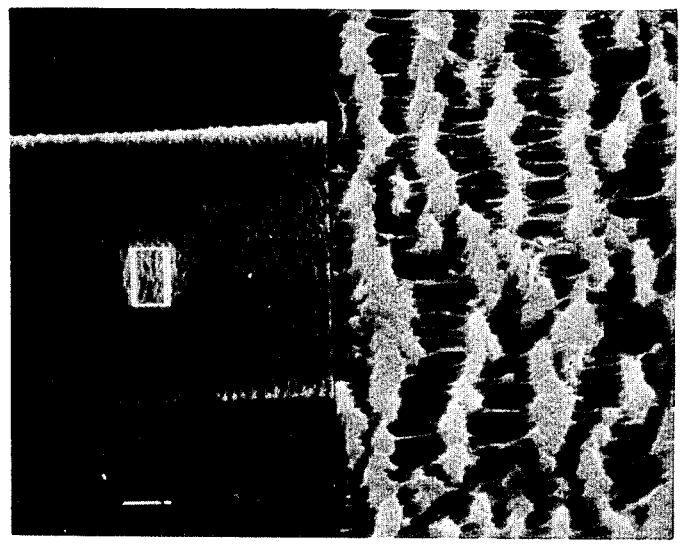
FIG. 6 is a photomicrograph of the cross-section of prior art PTFE material of FIG. 4.
Figure 7:
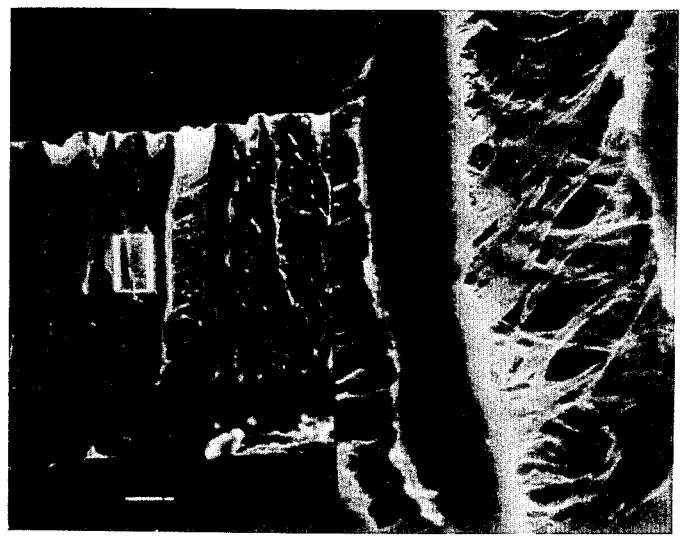
FIG. 7 is a photomicrograph of the cross-section of PTFE material of FIG. 5.

FIGS. 4 and 5 present scanning electron micrographs of the surfaces of final specimens (stretched and sintered) that had not been previously densified (nominal density of 1.63 gm/cc), and that had been previously densified to 2.27 gm/cc (nominal) prior to stretching, respectively. The magnifications for the left and right sides of these two micrographs (FIGS. 4 and 5) are about 155 and 1550, respectively. These micrographs readily demonstrate the difference in "coarseness" due to the effect of densification. FIGS. 6 and 7 present scanning electron micrographs of the cross-sections of the same two final specimens that had not been previously densified, and that had been previously densified (2.27 gm/cc), respectively. The magnifications for the left and right sides of the micrograph in FIG. 6 are about 152 and 1520, respectively. The magnifications for the left and right sides of the micrograph in FIG. 7 are about 147 and 1470, respectively. Again, the difference in coarseness is clear. These micrographs also demonstrate the difference in node height through the cross-section. The material produced by the process of this invention not only has nodes of greater heights compared to the material that had not been densified, but a significant number of the nodes are seen to extend completely through the cross-section, unlike the case of the undensified material. These micrographs are representative of all of the undensified control materials (1.63 gm/cc) and materials that had been densified at the density level, 2.27 gm/cc, regardless of densification temperature. The difference in coarseness as is apparent in FIGS. 4 and 5 and FIGS. 6 and 7 is reflected in the fibril length and node width measurements presented in Table 1. The materials made in accordance with the present invention had longer average fibril lengths and wider average node widths than materials that were not densified prior to stretching, but which had received other identical processing. Equally important, the data in Table 1 show the average matrix tensile strength in the stretch direction for all materials that had been densified prior to stretching to be at least of the same order of magnitude as the undensified, control materials. The combination of long fibril lengths, wide node widths, and high matrix tensile strengths relative to prior PTFE materials available from conventional processes is surprising.

Returning to Table 1, the fibril lengths and widths of the nodes (in the direction of stretching) were measured from scanning electron micrographs of cross-sections of the stretched, sintered materials in order to assess relative coarseness based upon the dimensions of the microstructure. The fibril length and node width measurements utilized scanning electron microscope pictures of about 150× magnification and dual magnification of 10× (about 1500× original), and the following steps:

1. SEM pictures were marked with two lines spaced approximately 24 mm apart, using a plexiglass fixture;
2. The fibril lengths were then determined using dividers to measure the internodal spacing along the outside edge of the line starting at the upper left corner of the picture at the first distinct node spacing. The divider was then placed on a scale that accounted for the magnification factor and the lines were read to the nearest half micron, and values recorded. This procedure was repeated for the next consecutive node spacings along this line and each measurement recorded;
3. The procedure was repeated to measure mode widths instead of space between nodes, and the data recorded.

Examination of these data shows that the materials that were densified to a maximum degree, that is, in the 2.27 gm/cc range, (and subsequently stretched and sintered) were significantly coarser than the other materials, as evidenced by the longer fibrils and wider nodes. The Table 1 data are exemplary and show stretched materials that were densified less than 2.27 gm/cc prior to stretching had longer fibril lengths and wider node widths than the control pieces, but that the 2.27 gm/cc range materials had markedly coarser structures with no appreciable loss in matrix tensile strength.

The data pertaining to Gurley number can characterize the coarseness of these materials. Lower values of this parameter indicate greater permeability of the structures. Permeability and, therefore, Gurley number measurements, are strongly dependent on path length. The use of Gurley number is an appropriate means of comparing the articles described in this example, however, since the materials were processed identically except for the densification step. The data pertaining to ethanol bubble point (EBP) also can characterize the coarseness of materials. Lower values of this parameter indicate greater maximum pore size of the structures. Greater permeability, as well as larger pore size, quantify greater coarseness. The data in Table 1 demonstrate the materials densified to about 1.83 and 2.01 gm/cc, upon stretching, exhibit lower values of the respective parameter than the 1.63 gm/cc control materials, and that the 2.27 gm/cc range materials had a markedly higher permeability and larger pore sizes than the 1.63 gm/cc control materials. The final materials that had been densified in the range of 2.27 gm/cc did have markedly lower values for these parameters than those materials that had been densified less.

The crushability test data in Table 1 demonstrates macroscopic manifestation of the coarse microstructure available through the present invention. In this test, the specimens were placed under a tensile load by applying a 0.5 lb. force to the material in direction of stretching. A thickness measurement was taken which constituted the original thickness. Next, an 18 oz. weight of 0.012 square inch area was applied to the specimen for 0.5 minutes and the resulting thickness recorded with the weight still applied. Percent crush, or crushability, is defined as $(t-C)/t \, (100\%)$, in which "t" is the original thickness, and "C" is the thickness under load. Lower values of crushability, therefore, indicate a higher resistance to being crushed (i.e., a higher crush-resistance).

Again the most remarkable feature of these data is the difference in crushability between the materials densified to about 2.27 gm/cc, although the materials densified to lower densities did show improved resistance to crushing over the undensified materials. The materials densified to about 2.27 gm/cc exhibited significantly greater resistance to being crushed as evidenced by lower crushability.

The testing data indicate that densifying the dry, calendered extrudate to about 2.27 gm/cc or greater (i.e., the range of highest densities) prior to stretching had an especially pronounced effect on the "coarseness" of the stretched, heat treated PTFE materials without detracting from the matrix tensile strength.

Other samples were subsequently processed in essentially the same manner in order to examine the utility of higher densification temperatures. The same ranges of density prior to stretching as used in the above-mentioned experiments were examined for higher ranges of densification temperature. Consistent results were not obtained with materials subjected to elevated densification temperatures. Many of the final specimens were grossly non-uniform in appearance, unlike any of the final specimens that had not been subjected to these elevated temperatures prior to stretching. Some of the retained samples that had been densified under identical conditions, but not stretched, were subjected to differential scanning calorimetry analysis. The identification of reduced heats of fusion for these materials compared to unprocessed resin indicated that the samples had been sintered to some extent. The unintentional sintering was attributed, in part, to non-uniformity of temperature across the plate. The important finding, however, is that partially or completely sintered materials, whether densified or not, cannot be stretched to yield uniform final materials for the above-mentioned stretch conditions.

The following conclusions can be reached from these tests:

1. The densification-stretching process yields high strength, coarse microstructure materials when extrudate is densified to 2.27 gm/cc. The 2.27 gm/cc density actually refers to a range of densities obtained. The maximum achievable density is included in this range.

2. The inclusion of a "dry" densification step (that is, with lubricant removed from the extrudate) of any degree of densification prior to stretching does not compromise the matrix tensile strength of the stretched material.

3. Densifying dry extrudate to a density of 2.27 gm/cc prior to stretching results in a stretched material with a coarse structure, quantified by EBP, Gurley number, node width and fibril length measurements. By comparison, densifying to lower densities, or not at all, prior to stetching results in a stretched material with a finer structure.

4. Densifying dry extrudate to a density of 2.27 gm/cc prior to stretching results in a more crush-resistant stretched material than if the dry extrudate is densified less, or not at all.

5. The degree of densification (as quantified by density measurements) has a very pronounced effect on the properties of the stretched material. The degree of densification essentially describes the salient feature of the densification process provided that the material has not been sintered.

6. The influence of temperature is to serve as a process catalyst. Less time is required to reach the desired density in the densification step for higher densification temperatures. Increased temperature of densification may allow the use of lower compressive forces in order to achieve densification.

7. The preferred densification conditions are those that do not result in any sintering of the dry extrudate.

TABLE 1

| | PROPERTIES OF THE FINAL SPECIMENS** | | | |
| --- | --- | --- | --- | --- |
| | Density Prior To Stretching | | | |
| | 1.63 ± .01 gm/cc* | 1.83 ± .02 gm/cc | 2.01 ± .02 gm/cc | 2.27 ± .05 gm/cc |
| Thickness (inch) | .0119 ± .0002 | .0118 ± .0002 | .0114 ± .0002 | .0112 ± .0005 |
| Density (gm/cc) | .56 ± .02 | .57 ± .02 | .59 ± .02 | .58 ± .04 |
| Matrix Tensile Strength (psi) | 15,600 ± 700 | 15,700 ± 900 | 15,900 ± 600 | 16,500 ± 100 |
| Fibril Length (microns) | 4. ± 1. | 5. ± 1. | 5. ± 1. | 23. ± 4. |
| Node Width (microns) | 3. ± 1. | 3. ± 1. | 4. ± 1. | 15. ± 3. |
| EBP (psi) | 7.8 ± .5 | 6.9 ± .4 | 6.4 ± .6 | 2.5 ± 1.0 |
| Gurley Number (seconds) | 27.5 ± 3.8 | 23.8 ± 3.5 | 19.4 ± 3.5 | 6.5 ± 2.4 |
| Crushability (%) | 15. ± 1. | 14. ± 2. | 14. ± 2. | 9. ± 2. |
| Coarseness Index [(gm/cc)/psi] | .07 | .08 | .09 | .23 |

**All values are rounded. The values presented are the means ± one standard deviation calculated from the mean values for each specimen produced at each density level prior to stretching.
*Control with no densification step.

EXAMPLE TWO

Films That Are Biaxially Stretched

Four other 4.5 inch by 4.5 inch samples of film of the type described in the first paragraph of Example One above were stretched in the pantograph machine. In this case, three samples were densified in the Carver press at temperatures of about 300° C. and a fourth sample was subjected to the same thermal conditions, but not densified. The undensified material served as a test control. The materials were densified in essentially the same manner as described in the third paragraph of Example One.

All four samples were stretched simultaneously in two directions at right angles to each other in the pantograph machine (described in Example One), 100% in each direction. Thus, the surface area of the stretched film was four times greater than the surface area of the original film. The film temperature was about 300° C. at the start of the stretching operation. Stretching rates of about 130% per second in each direction were used. Stretching rate was determined by dividing the percent change in length by the duration of the stretching operation. (The clamps of the pantograph moved apart at constant velocity.) The stretched specimens were then restrained from shrinking by placing them on a pin-frame, removed from the pantograph machine clamps, and immersed in a 370° C. salt bath for about 20 seconds, thereby sintering the specimens. The specimens were then cooled in water to yield the final specimens.

Figure 8:
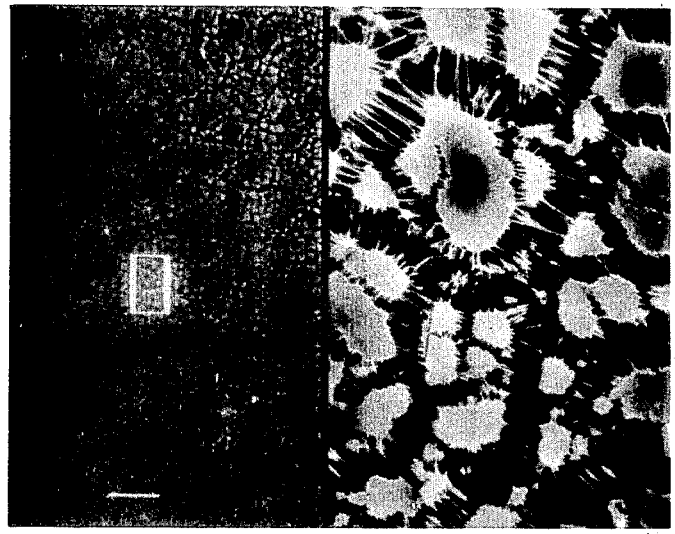
FIG. 8 is a photomicrograph of the surface of prior art PTFE material that was biaxially stretched.
Figure 9:
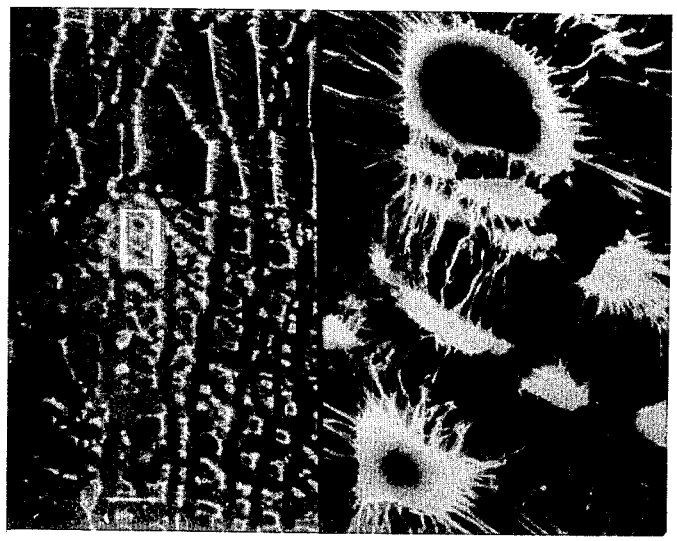
FIG. 9 is a photomicrograph of the surface of PTFE material of the present invention that was biaxially stretched.

The data in Table 2 show the effects of this invention. FIGS. 8 and 9 present scanning electron micrographs of the surfaces of the control material (1.61 gm/cc) and the material that had been densified to 2.25 gm/cc, respectively. The magnifications for the left and right sides of these micrographs in FIGS. 8 and 9 are about 150 and 1500, respectively. The relative coarseness of the material that had been densified to 2.25 gm/cc is readily apparent. These figures demonstrate the structural differences due to the invention that resulted in the difference in ethanol bubble points as indicated in Table 2. The micrograph in FIG. 9 is representative of the structure that resulted due to the inclusion of the densification step. The final material is not completely uniform, however, and some regions are not seen to be as coarse with regard to the dimensions of the microstructure as other regions of the same material. This non-uniformity is attributed to local inconsistencies during the densification.

The data in Table 2 show that the material that was densified the most prior to stretching was far more crush-resistant than the materials that were densified less or not at all. Four additional samples were produced from the same raw materials using the same processes in order to further examine the benefits of the present invention with respect to crush-resistance. The same range of densities prior to stretching was examined. These samples, unlike those whose data appear in Table 2, were not sintered subsequent to stretching. The data for these materials that were not sintered appear in Table 3. The crushability for the stretched materials with pre-stretching densities of 1.63, 1.89, 2.06, and 2.29 gm/cc were 30.1, 19.7, 10.2, and 3.6%, respectively, showing that those materials that were densified the most produced the most crush-resistant final products. Comparing the data for the sintered and unsintered materials that were not densified indicates that sintering serves to decrease crushability for undensified materials (from 30.1% to 14.6%, in this case). The material that was densified the most but not sintered was still far more crush-resistant (a crushability of 3.6%) than the undensified material that was sintered (which had a crushability of 14.6%).

Break forces were measured using specimens with a 1 inch gage length; the tensile tester cross-head speed was 10 inches per minute. The longitudinal direction is the primary direction of extrusion and calendering. The transverse direction is orthogonal to the longitudinal direction, in the plane of stretch.

TABLE 2

PROPERTIES OF THE FINAL SPECIMENS**

| | Density Prior To Stretching | | | |
|---|---|---|---|---|
| | 1.61 gm/cc* | 1.83 gm/cc | 2.02 gm/cc | 2.25 gm/cc |
| Thickness (inch) | .0111 | .0109 | .0105 | .0122 |
| Density (gm/cc) | .57 | .54 | .65 | .54 |
| Ethanol Bubble Point (psi) | 9.8 | 7.0 | 3.6 | 1.2 |
| Longitudinal Matrix Tensile Strength (psi) | 10,100 | 8,300 | 7,000 | 6,500 |
| Transverse Matrix Tensile Strength (psi) | 10,200 | 11,200 | 8,600 | 6,400 |
| Coarseness Index [(gm/cc)/psi] | .06 | .08 | .18 | .45 |
| Crushability (%) | 14.6 | 17.0 | 16.6 | 4.2 |

**All values are rounded.
*Control with no densification step.

TABLE 3

PROPERTIES OF THE FINAL SPECIMENS THAT WERE NOT SINTERED AFTER STRETCHING**

| | Density Prior To Stretching | | | |
|---|---|---|---|---|
| | 1.63 gm/cc* | 1.89 gm/cc | 2.06 gm/cc | 2.29 gm/cc |
| Thickness (inch) | .0146 | .0130 | .0120 | .0116 |
| Density (gm/cc) | .58 | .63 | .61 | .72 |
| Ethanol Bubble Point (psi) | 14.2 | 8.1 | 4.8 | 3.1 |
| Longitudinal Matrix Tensile Strength (psi) | 4,400 | 4,300 | 4,800 | 3,800 |
| Transverse Matrix Tensile Strength (psi) | 2,400 | 2,200 | 2,800 | 2,400 |
| Coarseness Index [(gm/cc)/psi] | .04 | .08 | .13 | .23 |
| Crushability (%) | 30.1 | 19.7 | 10.2 | 3.6 |

**All values are rounded.
*Control with no densification step.

EXAMPLE 3

Filaments That Are Uniaxially Stretched

Part A

Part A illustrates the effect a densification die can have on the microstructure of a uniaxially stretched filament. The processing of the two finished filaments described herein was adjusted to yield materials with equivalent diameters, densities, and matrix tensile strengths.

PTFE dispersion powder ("Fluon CD-123" resin produced by ICI America) was blended with 130 cc of "Isopar M" odorless solvent (produced by Exxon Corporation) per pound of PTFE, compressed into a pellet, and extruded into a 0.106 inch diameter filament in a ram extruder having a 95:1 reduction ratio in cross-sectional area from the pellet to the extruded filament.

The Isopar M was evaporated from a sample of the extruded filament. The density of this sample was about 1.49 gm/cc, and its matrix tensile strength was about 900 pounds per square inch.

The extruded filament still containing Isopar M was immersed in a container of Isopar M at 60° C., and stretched nine-fold (800%) between capstans with an output velocity of about 86.4 ft/min. These capstans had a diameter of about 2.8 inches and a center-to-center distance of about 4.5 inches. The diameter of the filament was reduced from about 0.106 inch to about 0.039 inch by this stretching. The Isopar M was removed from this stretched material. The density of the stretched filament was about 1.3 gm/cc, and the matrix tensile strength was about 5,400 pounds per square inch.

The stretched filament, from which the Isopar M had been removed, was then pulled through a circular densification die heated to 300° C. The output velocity of the material exiting the die was about 7.2 ft/minute. The opening in the die tapered at a 10° included angle from about 0.050 inch diameter to 0.030 inch diameter, and was then constant for a land length of about 0.030 inches.

The die diameter of 0.030 inches was chosen on the basis of two assumptions:
1. It was desirable to densify the stretched filament to approximately 2.2 gm/cc.
2. There would be no weight/meter change of the stretched rod as it underwent densification.

Using these assumptions, die diameter was calculated to represent the reduction in cross-sectional area necessary to increase the density of the stretched rod to about 2.2 gm/cc. In the specific case of the A-16 filament, that calculation was worked as follows:

$$D_2 = \left(D_1^2 \times \frac{\rho_1}{\rho_2}\right)^{\frac{1}{2}}$$

$$= \left(.039^2 \times \frac{1.3}{2.2}\right)^{\frac{1}{2}}$$

$$= .030 \text{ inches}$$

Figure 10:
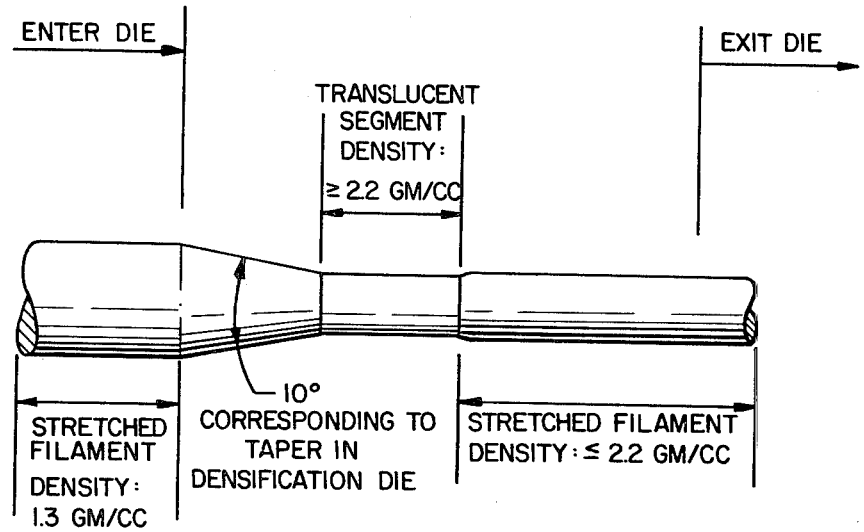
FIG. 10 is a schematic cross-section of the type of densification die used in Example 3.

$D_1$ = initial diameter of stretched rod in inches
$D_2$ = die diameter in inches
$\rho_1$ = initial density of stretched rod in gm/cc
$\rho_2$ = nominal value of void-free PTFE as 2.2 gm/cc Removing a piece of filament from the die, by halting the densification process and pulling the material back through the entrance of the die, showed that when the stretched filament was pulled through the densification die it developed a translucent segment characteristic of PTFE having a density of about 2.2 gm/cc. This segment corresponded to the 0.030 inch land length section in the die immediately following the 10° included angle transition (see FIG. 10).

As the material exited the die, however, it once again developed a white appearance characteristic of PTFE having a density less than about 2.2 gm/cc. This is because the force necessary to pull the stretched filament through the die is sufficient to cause some stretching of the material after it exits the die. This was confirmed by measuring the weight/meter of the material pre- and post-die. A decrease in weight/meter was noted in the material post-die, indicating stretching took place. Subsequent experimental work demonstrates that die diameters both greater and smaller than 0.030 inches can also effect the desired change in microstructure. The important consideration in choosing a die diameter is that it changes the cross-sectional area of the stretched rod so as to achieve a material density in the die greater than or equal to about 2.0 gm/cc. There is an increasing effect on structure with increasing densification.

The stretched filament, which had been pulled through the die, was then heated in a 300° C. oven and further stretched seven-fold (600%), from an initial length of about 7.2 inches, in a batch manner with a constant velocity of about 37 ft/min.

Finally, the filament was restrained from shrinking and heated in a 367° C. oven for 30 seconds.

As described in Table 4, the filament (A-16) from the final heat treatment had a density of about 0.4 gm/cc, a diameter of about 0.022 inch, and a matrix tensile strength of about 49,000 pounds per square inch. The structure was comprised of nodes of apparently solid PTFE interconnected by fibrils. The average fibril length was about 120 microns, the average node width about 17 microns (measured in the direction of stretch), and the average node height about 102 microns (measured orthogonal to the direction of stretch). The filament underwent a total stretch ratio of 79:1 from the extrudate stage. This was calculated by dividing the dried filament extrudate weight/meter by the finished filament weight/meter.

Figure 11A:
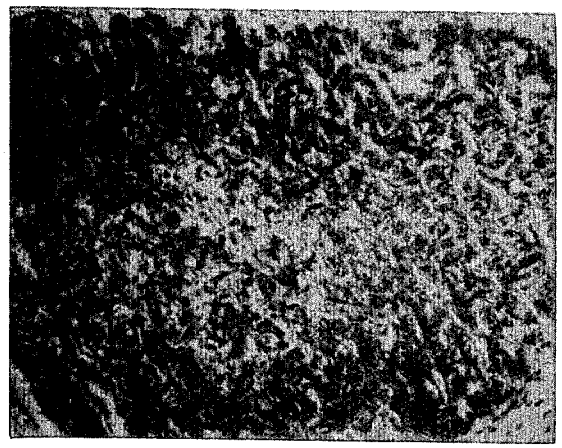
FIGS. 11A and 11B are light microscopy photographs of histological sections through filaments made in accordance with the recent invention and according to the prior art, respectively, showing collagen ingrowth.

One end of a length of the A-16 filament was heated, densified and then swaged onto a standard 0.022 inch diameter surgical needle, making a prototype suture with matching needle and thread diameters. This needle/thread combination is not currently available in the marketplace and has the potential advantage of reducing suture line bleeding in vascular anastomoses. This material was sewn into the tissue of a guinea pig and harvested after 30 days. Fibroblast cells had penetrated into the structure of the suture, and substantial collagen was formed throughout the inner structure of the suture (see FIG. 11A). Also, the suture became well embedded in the tissue. These attributes, combined with the material's strength and ease of handling, should make it useful as a suture.

Figure 11B:
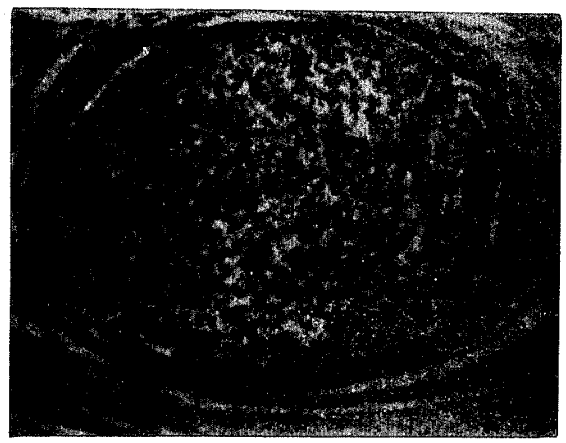

Another material (3-1-3) was manufactured using a process similar to that described above with the major exception that the stretched filament was not pulled through a densification die. Minor processing changes were necessary to achieve this equivalence. Specifically, the extruded filament had a diameter of about 0.090", a matrix tensile of about 1200 psi and it underwent a total stretch of 52:1 through the process. Table 4 demonstrates that this material has a diameter, matrix tensile strength, and density nearly indentical to that of the material which had been pulled through the die. When implanted in guinea pigs this material (3-1-3) permitted only minimal collagen penetration (see FIG. 11B).

Figure 12A:
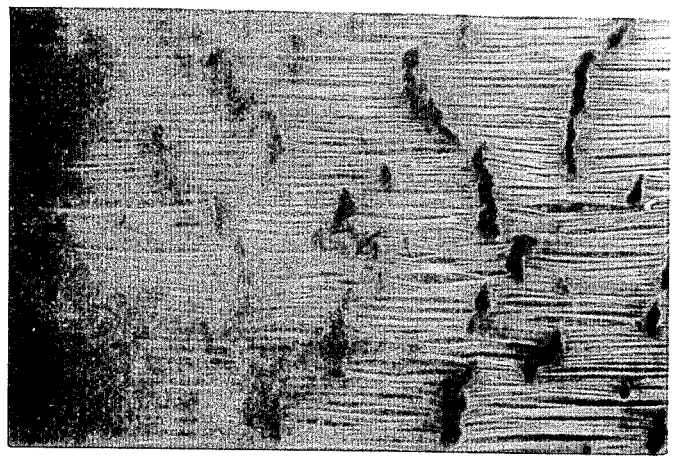
FIGS. 12A and 12B are photomicrographs of the filaments of FIGS. 11A and 11B, respectively.
Figure 12B:
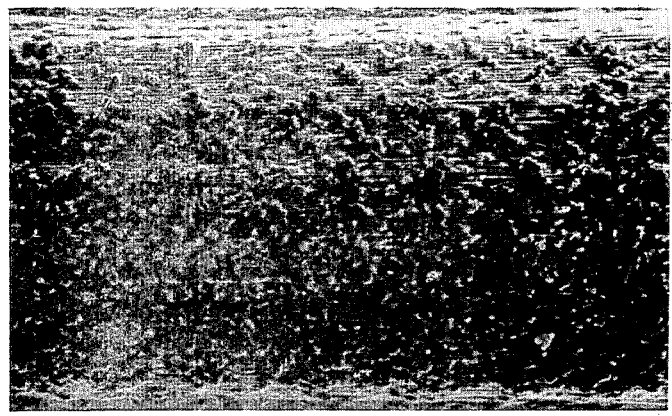

As illustrated by the pictures in FIGS. 12A and 12B and information in Table 4, these materials have vastly different microstructures. The A-16 material had much longer fibril lengths, and nodes where its height/width (H/W) ratio was substantially greater than in the undensified (3-1-3) material.

For materials with matrix tensile strengths greater than about 15,000 psi this node relationship of H/W is unique. Previously, only those materials with matrix tensile strengths less than about 15,000 psi had a node H/W ratio greater than or equal to 3. Conversely, when prior art matrix tensile strengths get above about 15,000 psi, the node H/W ratio drops below about 3. The only materials with matrix tensile strengths greater than or equal to about 15,000 psi having a node H/W ratio greater than or equal to about 3 are those materials which undergo a densification step prior to stretching, where the densification increases the specific gravity of the material to greater than or equal to about 2.0 g/cc. It appears from this example, that densification prior to final stretching may yield filaments having longer fibril lengths than would be achieved with similar amounts of stretch in a process not including a densification step.

Part B

The following example further illustrates the effect of the densification die on microstructure. No attempt was made to match characteristics of the finished filaments as in Part A. Final stretching of both materials described herein was adjusted so that they underwent identical amounts of stretch from the extrusion stage. This was done to investigate the effects of densification on equivalently stretched pieces of material from the same extrusion batch.

PTFE dispersion powder ("Fluon CD-123" resin produced by ICI America) was blended with 130 cc of "Isopar M" odorless solvent (produced by Exxon Corporation) per pound of PTFE, compressed into a pellet, and extruded into a 0.108 inch diameter rod in a ram extruder having a 153:1 reduction ratio in cross-sectional area from the pellet to the extruded filament.

The Isopar M was evaporated from a sample of the extruded filament. The density of this sample was 1.48 gm/cc and its matrix tensile strength was about 1,700 pounds per square inch.

The extruded filament still containing Isopar M was immersed in a container of Isopar M at 60° C. and stretched seven-fold (600%) between capstans with an output velocity of about 57.6 ft/min. These capstans had a diameter of about 2.8 inches and a center-to-center distance of about 4.5 inches. The diameter of the filament was reduced from about 0.108 inch to about 0.049 inch by this stretching. The Isopar M was removed from this stretched material. The density of the stretched filament was 1.02 g/cc and the matrix tensile strength was about 7,900 pounds per square inch.

At this point the stretched filament was divided into two separate lots for further processing. Lot 661 was pulled through a densification die, while Lot 665 was not.

The stretched filament (Lot 661), from which the Isopar M had been removed, was then pulled through a circular densification die heated to 300° C. Th output velocity of the material exiting the die was about 1.9 ft/minute. The opening in the die tapered at a 10° included angle from about 0.075 inch diameter to 0.026 inch diameter, and was then constant for a land length of about 0.026 inch.

The stretched filament (Lot 661), which had been pulled through the die, was then heated to 300° C. and further stretched 4.5 fold (350%) between capstans with an output velocity of about 13 ft/min. These capstans had a diameter of about 2.8 inches and a center-to-center distance of about 24 inches.

The stretched filament (Lot 665), which had not been pulled through the die, was heated in a 300° C. oven and further stretched eight-fold (700%) between the same capstan setup just described, using an output velocity of about 11.5 ft/min.

Finally, both rods (filaments) were restrained from shrinking and heated in a 362° C. oven for 60 seconds.

Figure 13A:
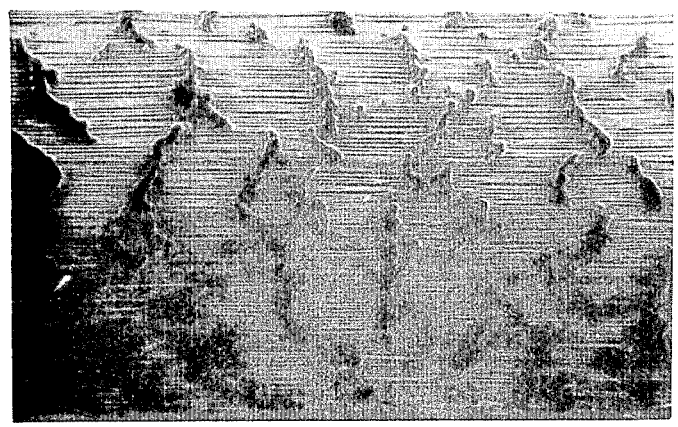
FIGS. 13A and 13B are photomicrographs of other filaments made in accordance with the present invention and according to the prior art, respectively.
Figure 13B:
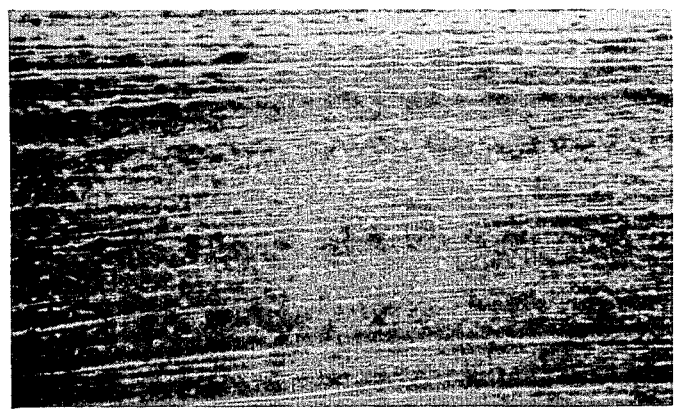

As illustrated by the pictures in FIGS. 13A and 13B and information in Table 5, these two types of material had vastly different microstructures. Lot 661 had much longer fibril lengths, and nodes where the H/W ratio was substantially larger than in the undensified (Lot 665) material. This example clearly illustrates that filaments which are densified prior to final stretching have much longer fibril lengths than do undensified filaments, when both materials undergo equivalent amounts of stretch.

These examples, Parts A and B, demonstrate that densifying a stretched filament through the use of a densification die can result in a high strength material with a unique microstructure upon further stretching. The important aspect of the invention is that the stretched filament was densified to greater than or equal to about 2.0 g/cc prior to additional stretching.

TABLE 4

| Finished Filament Characteristics | | |
|---|---|---|
| | A-16 (Die) | 3-1-3 (No Die) |
| Density (g/cc) | .4 | .5 |
| Matrix Tensile (psi) | 49,000 | 49,000 |
| Diameter (inches) | .022 | .022 |
| Node Width (microns) | 17 | 9 |
| Node Height (microns) | 102 | 16 |
| H/W Ratio | 6 | 1.8 |
| Fibril Length (microns) | 120 | 32 |
| TOTAL STRETCH RATIO | 79:1 | 52:1 |
| TISSUE INGROWTH | collagen throughout interstices at 30 days | minimum collagen infiltration at 30 days |

TABLE 5

| Finished Filament Characteristics | | |
|---|---|---|
| | 661 (Die) | 665 (No Die) |
| Density (g/cc) | .6 | .5 |
| Matrix Tensile (psi) | 55,000 | 64,000 |
| Diameter (inches) | .022 | .025 |
| Node Width (microns) | 11 | 6 |
| Node Height (microns) | 79 | 3 |
| H/W Ratio | 7.2 | .5 |
| Fibril Length (microns) | 74 | 16 |
| TOTAL STRETCH RATIO | 58:1 | 57:1 |

To obtain the above listed densities, material volume were calculated from diameter and length measurements, and this volume was divided into the weight of the material. Density calculations are accurate to two decimal places. Matrix tensile values were calculated as described above and are accurate to one decimal place. Diameters were measured using a non-contacting laser micrometer. The values listed represent the average diameter of several feet of material and are accurate to four decimal places.

To obtain node widths, node heights, and fibril lengths, pictures with a 200:1 magnification were used. The pictures were taken on a scanning electron microscope and a Nikon Biophot (Brightfield Microscope). Measurements were taken with millimeter calipers and then converted to microns. Measurements were chosen (4 to 5 measurements per picture for a given material type) by randomly drawing two horizontal lines on each picture approximately 1 inch apart. Five consecutive measurements were then taken, starting at the left margin. After obtaining 20 measurements, mean valves were calculated. Node width, node height, and fibril length values are accurate to one decimal place. Total stretch ratio was calculated by dividing the dried filament extrudate weight/meter by the finished filament weight/meter. Ratios calculated are accurate to one decimal place.

What is claimed is:

1. A process for producing a porous material of polytetrafluoroethylene polymer, which material is characterized by relatively large nodes interconnected by realtively long fibrils and having relatively high matrix tensile strength, the material having been produced from paste-extruded unsintered polytetrafluoroethylene extrudate, the process comprising the steps:
   (a) providing an unsintered dry extrudate;
   (b) increasing the density of the dry extrudate to greater than about 1.80 gm/cc at a temperature below the crystalline melt temperature of PTFE; and
   (c) stretching said densified dry extrudate at an elevated temperature less than the crystalline melt temperature.

2. The process as in claim 1 wherein said densification step increeas the dry extrudate density to greater than about 2.0 gm/cc.

3. The process as in claim 1 wherein said densification step increases the dry extrudate density to greater than about 2.2 gm/cc.

4. The process as in claim 1 wherein said densification step increases the dry extrudate density to about its maximum value.

5. The process as in claim 1 wherein the densification step is accomplished by densifying the dry extrudate in a press.

6. The process as in claim 1 wherein the densification step is accomplished by calendering the dry extrudate.

7. The process as in claim 1 wherein the densification step is accomplished by drawing the dry extrudate through a densification die.

8. The process as in claim 1, 5, 6 or 7 wherein the densified dry extrudate is stretched uniaxially.

9. The process as in claim 1, 5 or 6 wherein the densified dry extrudate is stretched biaxially.

10. The process as in claim 1 wherein the stretching step is carried out at about 300° C.

11. The process as in claim 1 wherein the densification step is carried out at an elevated temperature less than the crystalline melt temperature.

12. The process as in claim 11 wherein the densification step is carried out at about 300° C.

13. The process as in claim 1 further including the step of heating the stretched article above the crystalline melt temperature, to sinter the stretched article, while restraining the stretched article from shrinking.

14. The process as in claim 1, 6 or 7 wherein the densification and stretching steps are carried out continuously.

15. The process as in claim 1, 2, 3 or 4 further including the step of stretching said dry extrudate before said densification step.

16. The process as in claim 1 wherein the step of providing a dry extrudate includes the substeps of:
   (i) mechanically working an extrudate containing an extrusion aid lubricant to obtain a desired shape; and
   (ii) drying the worked extrudate to remove the lubricant.

17. The process as in claim 16 wherein said mechanical working substep includes the step of calendering the extrudate containing lubricant.

18. The process as in claim 16 wherein said mechanical working substep includes the step of stretching the extrudate containing the lubricant.

* * * * *